United States Patent [19]

Newbury et al.

[11] 3,865,614

[45] Feb. 11, 1975

[54] METHOD FOR COATING URANIUM IMPREGNATED GRAPHITE WITH ZIRCONIUM CARBIDE

[75] Inventors: Ray S. Newbury, Livermore; Geoffrey R. Tully, Jr., Alamo, both of Calif.

[73] Assignee: The United States of America as represented by the United States Atomic Energy Commission, Washington, D.C.

[22] Filed: Apr. 2, 1959

[21] Appl. No.: 803,810

[52] U.S. Cl. ............... 117/46 CA, 176/82, 176/93, 176/71, 176/DIG. 3, 176/87, 117/47 R, 117/46 CB, 117/95, 117/DIG. 11
[51] Int. Cl. .............................................. B44d 5/12
[58] Field of Search .................. 204/193.38, 193.34; 117/215, 221, 228, 46, 95, 47, DIG. 11; 176/82, 83, 71, 87, DIG. 3

[56] References Cited
UNITED STATES PATENTS
2,447,973   8/1948   Williams ............................. 117/221
2,910,379   10/1959  Gurinsky ......................... 204/193.38

OTHER PUBLICATIONS
NAA-SR-240, Preparation of Fuel Elements for the NAA Homogeneous Graphite Reasearch Reactor, USAEC Report issued Aug. 12, 1953, declassified Aug. 23, 1957; pp. 1-16.

Primary Examiner—Harvey E. Behrend
Attorney, Agent, or Firm—John A. Horan; F. A. Robertson

EXEMPLARY CLAIM

1. In a process for producing a tenacious zirconium carbide coating on graphite impregnated with uranium comprising the steps of impregnating a piece of porous graphite with uranyl nitrate dihydrate dissolved in tertiary butyl alcohol, enveloping said graphite piece in clean tertiary butyl alcohol solvent to dissolve said uranyl nitrate dihydrate impregnant from the surface of said graphite into a liquid, enveloping said graphite piece in liquid nitrogen to freeze said impregnated solution, evaporating said frozen solvent therefrom, whereby said uranyl nitrate dihydrate is deposited within said graphite pores, converting said uranium to the carbide by the application of heat, outgassing said graphite, applying a coating of finely divided zirconium suspended in liquid containing a carbonaceous binder onto said graphite surface, evaporating said liquid and converting said zirconium to the carbide by the application of heat whereby a zirconium carbide coating is obtained.

1 Claim, No Drawings

METHOD FOR COATING URANIUM IMPREGNATED GRAPHITE WITH ZIRCONIUM CARBIDE

This invention relates to a method producing refractory coatings of metallic carbides upon graphite surfaces. More specifically this invention relates to a method for producing refractory coatings of zirconium carbide upon the surfaces of graphite impregnated with uranium.

This invention provides uranium impregnated graphite coated with the carbide of a refractory metal for nuclear reactor core pieces and a method of producing same. In order to provide this, porous graphite is first impregnated with uranium. The outermost impregnated uranium is removed by a dissolution step prior to fixation of the uranium; and a refractory metal dispersed in a solution or slurry containing carbonaceous matter is then applied to the graphite surface. The metal is carburized in place to produce a layer of metal carbide integral with the graphite.

In the present age of nuclear reactors, high speed missiles and jet or rocket propulsion engines and many other technological fields there are ever increasing needs for refractory structures and surfaces which are stable and retain strength at much higher operating temperatures than heretofore employed and often in the presence of oxidizing or reducing atmospheres, ionizing radiation, high pressures or vacuums, and other severe and unusual conditions which ordinary materials of construction will not withstand. Graphitic carbon is a material which admirably satisfies many of the necessary requirements in this field. Graphite possesses highly desirable properties including low density, high melting or sublimation point and high structural strength at higher temperatures, permitting its use where most other structural materials, including common metals, are not satisfactory. In addition, graphite has a low neutron absorption cross-section while possessing the adequate moderating capacity required in nuclear reactors and associated systems.

However, the normal properties of graphite are inadequate in certain respects and in particular environments. Graphite erodes and corrodes at high gas pressures, velocities and temperatures. Many gases and other materials react with graphite or are absorbed in an undesirable manner in certain environments.

Erosion, corrosion, reaction and migration is greatly increased at high temperatures when the graphite is loaded or impregnated with another solid material. Impregnation of solid porous graphite is frequently desired in order to produce some special physical characteristic, such as imperviability to liquids, or to increase structural strength, or to decrease chemical reactivity, or to increase the area of contact of the porous graphite and another substance so that the chemical activity may be more complete, and for other obvious reasons.

In the nuclear arts impregnation is sometimes required to increase the density of the graphite, or to disperse a poison or a fissionable fuel, such as uranium-235, throughout the graphite. Although adaptable to many other systems, such core materials are particularly preferable for high temperature (above 1500°C) gas cooled solid core reactors suitable either as power reactors or as short-lived thrust propelled space vehicles, in which the coolant or propellant is preferably introduced into the core through channels or tubes spaced throughout the core to provide optimum heat exchange. By utilizing an impregnated graphite the structural strength of the original graphite is maintained, thereby avoiding difficulties inherent in the use of pressed graphite shapes. However, at high temperatures the impregnated uranium tends to migrate and to some extent enter the propellant gas stream, making necessary neutronic controls or excess compensatory reactivity which might not otherwise be necessary, and in general shortening the time period over which the reactor can be run.

To protect the graphite and uranium or other materials in nuclear reactors, for example, graphite moderator blocks have been contained within a non-reactive metal such as zirconium or aluminum to prevent absorption of or reaction with the coolant. However, in gas cooled reactors and especially in mobile, lightweight, compact reactors having single piece graphite cores, this form of construction is disadvantageous due to bulk, low structural strength, construction problems, and other factors. A preferred method of protecting the graphite is to carburize a layer of refractory metal directly onto the graphite surface. Much effort has been directed in developing such methods as evidenced by copending U.S. Pat. application Ser. No. 759,830, filed Sept. 8, 1958 by James S. Kane, John H. Carpenter and O. H. Krikorian, entitled Method for Coating Graphite with Niobium Carbide, in which the special wetting properties of niobium at high temperatures are utilized to disperse niobium onto graphite followed by carburization; U.S. Pat. application Ser. No. 770,901 filed Oct. 30, 1958 by Frank A. Halden, William D. Smiley and Frank M. Hruz, entitled Refractory NiobiumTitanium Carbide Coatings for Graphite and a Method of Producing Same, in which wetting and carburization of niobium on a graphite surface is facilitated through addition of titanium thereto; and U.S. Patent No. 2,929,741, issued Mar. 22, 1960, Morris A. Steinburg, Method for Coating Graphite with Metallic Carbides, in which wetting and carburization of graphite is achieved with a refractory metal dissolved in a metal having a lower boiling point. However, difficulty has been reported in achieving tenacious, hard coatings where the entire graphite piece is impregnated with uranium, and the problem has generally been solved only by restricting the coatings to pieces wherein no impregnant uranium is present. Reasons for the difficulty have been attributed to the outgassing of uranium impregnant decomposition products, such as $CO_2$, to the reaction of the uranium with residual absorbed air, to the migration of uranium compounds, usually the oxide, and to the reacting of the refractory metal directly with the uranium compounds.

Now there has been discovered a method for producing satisfactory refractory metal carbide coatings on graphite which has been entirely impregnated throughout with a uranium impregnant. The coating achieved compares favorably with that obtainable under the most favorable conditions with graphite which has not been impregnated. Specifically the method comprises first impregnating porous graphite with uranyl nitrate dissolved in tertiary butyl alcohol by conventional methods known in the prior art. The impregnated block of graphite is dipped in fresh clean tertiary butyl alcohol briefly to dilute, dissolve and remove the uranyl nitrate from the immediate surface area of the graphite, and is then frozen. The solvent is thereafter sublimed from the graphite by a special procedure using pulses of heated gas, as disclosed elsewhere in the art and discussed at length hereinafter. Upon removal of all the solvent, leaving behind the uranyl nitrate deposit, the graphite is outgassed and baked to convert the uranium to the carbide or oxide. Using this process the uranium unexpectedly does not migrate to the surface and the boundary between the impregnated and non-impregnated graphite is sharply defined. After outgassing, a coating of a refractory metal dispersed together with a carbonaceous binder within a liquid is next applied to the surface of the graphite and then fired at a high temperature to convert the metal to the carbide.

Accordingly, an object of the invention is to provide a method for coating uranium impregnated graphite with a metal or refractory metal carbide.

A further object of the invention is to provide a method for impregnating graphite with a uranium bearing material, removing the uranium bearing material from the surface thereof and thereafter coating said free surface area with a refractory metal carbide.

The graphite structures or surfaces to be coated are provided or fabricated in accordance with conventional practices. For example reactor components may be machined from graphite of the usual reactor grades. No particular geometry is specified. However, in certain gas cooled reactors, uranium impregnated graphite cores having a plurality of gas cooled passages or channels are employed.

Accordingly, after selection of the graphite pieces, the graphite density distribution and total available void volume are next determined. The density distribution must be uniform in order to insure uniform uranium distribution and deviates are therefore rejected. The total available void volume, or "available porosity" must be known in order to determine the uranium impregnant concentration necessary to impregnate the graphite with enough uranium to produce a critical assembly for the particular reactor configuration chosen. Requirements generally vary from one mole uranium per 350 moles carbon to one mole uranium per 2000 moles carbon. Ease of impregnation is also partially dependent upon pore size. Graphite with an average of about 15% voids has been found well suited for most uses.

A solution is next made up of the material with which it is desired to impregnate the graphite. While the uranyl nitrate dihydrate and the solvent tertiary butyl alcohol are represented as the preferred embodiments, it is obvious that other solid materials and other solvents may be substituted. The process is limited not by the character of the solution, so long as it is relatively non-viscous and capable of wetting graphite, but rather by the character of the graphite. Accordingly, a solution of uranyl nitrate dihydrate dissolved in tertiary butyl alcohol is prepared which will result in a carbon to uranium ratio in the range 2000/1 to 700/1, such solutions containing from 15 to 45 wt % uranyl nitrate dihydrate, respectively. Two impregnations of the 45% solution are required for 350/1 loading. If used immediately after prepartion the solution might, under minimal requirements, be impregnated under the process described herein; however, such solution tends to precipitate the uranium from a solvolysis reaction occurring within two or three days or less and hence such solutions containing an additive which prevents such precipitation for a longer period of time are preferred. Additives consisting a material selected from the group comprising lactic acid, acetic acid, monochloroacetic acid and acetic anhydridge, are preferred, as described in copending U.S. Pat. application Ser. No. 769,520 (48), filed Oct. 24, 1958 by Robert E. Elson, Raymond D. Heminger and Geoffrey R. Tully, Jr. entitled Stabilized Uranyl Nitrate Composition and Uranium Impregnation Method. In accordance with the invention described in the above application one of the stabilizing agents is added to and dissolved in the solution of uranyl nitrate dihydrate (UND) in tertiary butyl alcohol (TBA) at a temperature above 50°C, in certain critical amounts, as follows: lactic acid, 0.7 to 1.1 moles per mole UND; acetic acid, 0.6 to 1.2 moles per mole UND; monochloroacetic acid, 0.6 to 1.2 moles per mole UND. and acetic anhydride, 0.1 to 0.5 moles per mole UND. Solutions containing one of the above additives in specific amounts are in general stable for two weeks or more. Stability time varies with the concentration of the three constituents as disclosed in the reference. For example, solutions containing varying amounts of lactic acid are stable for periods of time from 2 to over 45 days. Two other properties also vary with time when these additives are used; namely, solidification and freezing temperatures. Solidification temperatures for given solutions, at which temperatures a gel is formed, all tend to become lower over a period of time. The solidified or frozen solution may be dissolved upon raising the temperature of the solution above the solidification temperature as long as the solution remains stable. The solution must normally be maintained at a temperature of 40° to 50°C in order to avoid solidification and this is the temperature most advantageous for impregnation. Unstable precipitated solutions cannot be dissolved by raising the temperature.

Impregnation of the graphite is carried out by first placing the graphite pieces in the bottom of a stainless steel, glass or other container which is capable of being exteriorly heated and evacuated. The process is carried out using the process taught in U.S. Patent Application Ser. No. 417,099, filed Mar. 17, 1954 by James J. Shyne, entitled Impregnating Graphite, and generally known as the North American Aviation method. Variations taught in a pending U.S. Pat. application Ser. No. 769,521, filed Oct. 21, 1958 by Geoffrey R. Tully, Jr., entitled Improved Method for Impregnation of Graphite, are also utilized. This last last-named application discloses the state of the art; pertinent sections are also discussed hereinafter in this application.

Accordingly, the container is evacuated with an ordinary mechanical pump in order to remove gases both entrapped in the graphite pores and chemi-absorbed in the graphite itself. Ease of impregnation is somewhat correlative with the evacuation time; however, evacuation times of an hour or less generally suffice. Sufficient UND-TBA solution containing an additive and heated to 40° to 70°C is now added to the container to envelope the graphite pieces and an additional amount is added corresponding to the volume of the graphite pores which will be impregnated. The temperature is maintained above the solidification point. Atmospheric pressure is maintained over the solution; this pressure combined with the weight of the solution immediately forces an amount of the solution into the exterior pores. An over pressure may be used to increase the depth of penetration. The depth of penetration without further process steps is limited however, and maximum penetration will generally be achieved within an hour. The depth may be increased by alternately evacuating the free volume above the solution and pressurizing it. Evacuation of the volume lowers the pressure within the graphite pores and is accompanied by formation of bubbles of entrapped gas at the surface of the graphite. This gas continues to rise through the liquid to the surface thereof for a short period of time, of the order of 30 minutes, until gas evolution ceases. An overpressure is then applied upon the liquid and the liquid penetrates the graphite to a depth greater than the previous penetration. Further vacuum and overpressure cycles impregnate the graphite to greater depths. Because in a neutronic reactor heat must be conducted from the interior of the impregnated graphite to the exterior thereof, there may be a limit to the depth the graphite should be loaded with uranium without causing interior portions to be heated excessively. The depth of impregnation encountered in present designs is generally less than 650 mils, which depth can be achieved by the present method.

After impregnation the solution is dropped away and the graphite blocks are removed from the container. The blocks or pieces containing the impregnated uranium solution are next washed or dipped for a few seconds in clean tertiary butyl alcohol. This step not only removes loose uranyl nitrate from the exterior of the graphite but also dissolves it from the pores adjacent to the surface for a depth of 1 mil or more, leaving a surface of pure clean graphite. The impregnated solution is then frozen in liquid nitrogen and maintained at a temperature just below the freezing point of the solution. The graphite piece is next subjected to a vacuum and then to an overpressure with non-reactive gas such as argon heated to the critical temperature of 40° to 55°C whereby a small increment of solvent is sublimed. The overpressure is continued for only about 1 or 2 minutes and the graphite piece is then again evacuated, removing the sublimed solvent. The pressures involved are not critical and there is no particular pressure at which an advantageous result is obtained. A total time of from 20 to 40 hours are required to completely remove all solvent from blocks having maximum penetration of 650 mils. There results a graphite piece in which the uranium salt is uniformly dispersed throughout the impregnated area.

The uranyl nitrate dihydrate decomposes to the oxide of uranium upon heating the graphite to a few hundred degrees centigrade, and the uranium may be further reduced to the carbide by prolonged heating at higher temperatures. Strict observation of the procedure detailed hereinabove results in a graphite block or piece in which no uranium bearing material appears at the immediate graphite surface; and in fact an integral boundary is maintained between the uranium impregnated and non-impregnated sections and without migration or movement of the uranium into the clean area during bakeout.

If desired the impregnated graphite may be initially baked out only to the point where the uranium is converted to the tri-oxide, $UO_3$. However, prior to application of the refractory metallic carbide coating to the exterior of the graphite, the uranium should be baked out at higher temperatures to convert to the dioxide and then to the carbide, and finally outgassed until the vapor pressure drops to a low level, e.g., 10 microns. This is done to preclude the appearance of gaseous impurities during carburization.

After outgassing, a liquid dispersion of a powdered refractory metal together with carbonaceous material is applied to the graphite surface and the graphite and coating is fired at high temperature to carburize the metal to form a thin continuous coating of adherent metal carbide. The composition of the metal dispersion is not critical at all and any one of a variety of aqueous or organic solvents may be used together with an organic binder. The organic binder is essential in order to provide for the complete carbonization of the metal. In a typical application a quantity of refractory metal and/or metal oxide, i.e., Mo, Zr, Nb, is ground in a ball mill to at least −200 mesh and suspended in a lacquer prepared from acetone, isobutyl methacrylate and dibutyl phthalate. Successful coatings have also been made in the coating art by merely suspending metal powders in a lacquer alone, or by suspending metal powders in a water slurry together with a carbohydrate binder. The suspension may be applied to the graphite by painting, dipping, spraying or other methods. Generally firing is not attempted until after evaporation of the solvent.

The resulting coating, after firing to temperatures of the order of 2000°C, is uniform and continuous, having no cracks and being 1–2 mils thick. Stringers of carbide penetrate the carbon surface to enhance the tenacity of the bond. Contrary to expectations the uranium carbide does not interfere with the metal coating in any way. It is hypothesized that with the high bakeout temperatures and attention to outgassing the uranium carbide is not available to migrate to the surface. Where heavier coats are desired, additional applications by the method may be necessary.

An actual nuclear reactor design incorporating graphite blocks uniformly impregnated with enriched uranium oxide is discussed in "Proceedings of the 1953 Conference on Nuclear Energy," pages A–15 to A–33, held at the University of California at Berkeley, Sept. 9–11, 1953, and available from California Book Company, 2310 Telegraph Avenue, Berkeley 4, Calif. See also Glasstone, "Principles of Nuclear Reactor Engineering," D. Van Nostrand Co., page 725, paragraph 12.31, and Science, 119,15 (1954). In the typical research reactor described, the impregnated graphite core comprises approximately 800 liters of graphite moderator having a total uranium–235 mass of approximately 3.5 kilograms. Uranium–235 concentration is approximately 4.5 milligrams/cc of graphite. The graphite is in the form of 140 stacked blocks which have physical dimensions of 4.18 inches on a side, 21 inches long, and a 1.25 inches-in-diameter coaxial hole extending the entire length. In operation, the coaxial holes in the graphite stacks are used to convey a coolant fluid, thereby continuously cooling the fuel blocks.

Design of a gas cooled mobile prototype reactor comprising a uranium impregnated graphite core material having axial bores therethrough for flow of liquid and/or gas coolant or propellant is described in detail in Report UCRL–4960, entitled Tory I Reactor, dated Sept. 1957, University of California Radiation Laboratory, Berkeley, Calif. In the reactor as designed, the fuel and core operate at temperatures up to 3000°C while the heavy water reflector is at room temperature and the liquid gas coolant enters the reactor at a very low temperature and emerges at a temperature approximating that of the core. Nitrogen, hydrogen and/or ammonia is used as coolant under an initial pressure of 305 psi. Because of the high temperature of operation a carbon wool blanket is preferably disposed between the core and heavy water reflector. Operating time is a few minutes. The core comprises 19 graphite columns of hexagonal or modified hexagonal cross sections 5.4 inches across flats, each column being composed of ten 5.2 inch long graphite blocks impregnated with 92% $U^{235}$ at a carbon to uranium ratio of 800:1. Total weight of $U^{235}$ is about 34.4 pounds, depending upon the core configuration. End reflectors are graphite, and the axial reflector comprises 12,400 pounds of heavy water.

EXAMPLE

A graphite tube 18 inches long, ¾ inch outside diameter and ¼ inch inside diameter was selected for impregnation and coating. The graphite was "ATJ" grade graphite, near reactor grade in purity, having 15% voids and a fairly uniform porosity, manufactured by Union Carbide & Carbon Corporation. Impregnation was carried out with a solution of uranyl nitrate dihydrate dissolved in tertiary butyl alcohol to which lactic acid had been added to stabilize the solution, as described in the aforementioned copending U.S. Pat. application Ser. No. 769,520 filed Oct. 24, 1958 by Robert E. Elson, Raymond D. Heminger and Geoffrey R. Tully, Jr., entitled Stabilized Uranyl Nitrate Composition and Uranium Impregnation Method. Uniform impregnation throughout the entire tube with 2 percent by weight of natural uranium, based upon the weight of the graphite, was achieved using the method described in the aforementioned copending U.S. Pat. application Ser. No. 769,521, filed Oct. 21, 1958 by Geoffrey R. Tull, Jr. and Leslie D. Christensen, entitled Improved Method for Impregnation of Graphite, except that at the end of the impregnation process and prior to freezing the graphite tube in liquid nitrogen, the tube was washed in a bath of clean tertiary butyl alcohol four times for times of the order of 15 sec each. The tube was then frozen in liquid nitrogen and the solvent removed as described hereinbefore, and also described more in detail in the above mentioned applications. Subsequently the tube was heated in a furnace to about 275°C whereby the uranium was converted to $UO_3$. The process was discontinued at this step and the tube was stored in air until the preparations for the coating step were completed.

Before application of the coating the uranium was converted to the carbide in several steps. Initially a vertical induction furnace was used to heat the tube to 1000°C at a uniform rate of temperature rise over a period of one hour. A vacuum of 10 microns was applied to the system during this heating step, but as the temperature rose the actual pressures were much higher until the gas and organic material in the tube were pumped out. At the end of 1 hour the pressure had once again dropped to 10 microns. The uranium was converted to a lower oxide, $UO_2$, in this operation.

The temperature of the furnace was then increased to a point where the uranium was carburized. The temperature was raised at a rate of about 100° to 200°C every 5 minutes. A uniform pressure ot 10 microns was maintained but at 1700°C the pressure again increased, indicating outgassing, caused by carburization. Outgassing was essentially complete at 1750°C but the furnace was allowed to reach a temperature of 2100°C before being shut down. Total furnace heating time during this latter step above 1000°C was 1 ½ hours.

Examination of cross section specimens from identical tubes similarly impregnated by X-ray techniques indicated that no uranium migrated to the surface and in fact uranium was effectively excluded from the area about one micron inward from the surface of the graphite when the tubes were enveloped for a time period of at least one minute in the tertiary butyl alcohol washing step.

After being allowed to cool the carburized impregnated graphite tube bore was coated with a lacquer having finely divided zirconium suspended therein. Specifically the solution was prepared by mixing together, in the following proportions, 120 grams −200 mesh zirconium powders and 90 ml lacquer containing proportionately 200 ml acetone, 20 grams of isobutyl methacrylate and 2 ml of dibutyl phthalate, until a suspension was obtained. The lacquer was lightly and evenly applied so that there was no dripping or running. The solvent evaporated within a minute or two leaving a thin layer of zirconium dispersed evenly within a carbonaceous material which adhered tightly to the tube surface.

The tube was again placed in the furnace and subjected to a temperature rise of 200° to 300°C every 5 minutes. Pumping sufficient to maintain a vacuum pressure of 10 microns was again maintained. Heating was continued until the temperature reached about 2050°C, requiring a total heating time of 35 minutes. Upon being allowed to cool the tube was found to be coated with a 1–2 mil coat of zirconium carbide which adhered tenaciously to the carbon tube. No flaws of any sort were discovered in visual and X-ray studies of the tube cross sections.

While the invention has been disclosed with respect to several preferred embodiments, it will be apparent to those skilled in the art that numerous variations and modification may be made within the spirit and scope of the invention and thus it is not intended to limit the invention except as defined in the following claims.

What is claimed is:

1. In a process for producing a tenacious zirconium carbide coating on graphite impregnated with uranium comprising the steps of impregnating a piece of porous graphite with uranyl nitrate dihydrate dissolved in tertiary butyl alcohol, enveloping said graphite piece in clean tertiary butyl alcohol solvent to dissolve said uranyl nitrate dihydrate impregnant from the surface of said graphite into a liquid, enveloping said graphite piece in liquid nitrogen to freeze said impregnated solution, evaporating said frozen solvent therefrom, whereby said uranyl nitrate dihydrate is deposited within said graphite pores, converting said uranium to the carbide by the application of heat, outgassing said graphite, applying a coating of finely divided zirconium suspended in liquid containing a carbonaceous binder onto said graphite surface, evaporating said liquid and converting said zirconium to the carbide by the application of heat whereby a zirconium carbide coating is obtained.

2. The process of claim 1 in in which said graphite is in the shape of a graphite tube. 2000°

3. The process of claim 1 which the coating containing a suspension of zirconium in a carbonaceous binder adhering to said graphite surface is converted to the carbide by heating to a temperature of the order of 200°C in a vacuum furnace.

* * * * *